United States Patent
Izumi

(10) Patent No.: US 6,275,517 B1
(45) Date of Patent: *Aug. 14, 2001

(54) WIRELESS COMMUNICATION APPARATUS USING FREQUENCY HOPPING, AND METHOD OF CONTROLLING THE APPARATUS

(75) Inventor: Michihiro Izumi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/822,606

(22) Filed: Mar. 19, 1997

(30) Foreign Application Priority Data

Mar. 19, 1996 (JP) .................................. 8-062829

(51) Int. Cl.⁷ .................................................. H04B 15/00
(52) U.S. Cl. ........................ 375/133; 340/825.2; 370/350
(58) Field of Search .................... 340/825.2, 825.14; 371/5.4, 22.36, 42, 47.1; 375/202, 354, 362, 364, 132–137; 370/503, 1

(56) References Cited

U.S. PATENT DOCUMENTS

| | | | | |
|---|---|---|---|---|
| 4,850,036 | * | 7/1989 | Smith | 375/202 X |
| 5,442,659 | * | 8/1995 | Bauchot et al. | 375/202 |
| 5,541,954 | * | 7/1996 | Emi | 375/202 |
| 5,581,548 | * | 12/1996 | Ugland et al. | 375/202 X |
| 5,640,415 | * | 6/1997 | Pandula | 375/202 |

\* cited by examiner

Primary Examiner—Brian Zimmerman
(74) Attorney, Agent, or Firm—Fitzpatrick, Cella, Harper & Scinto

(57) ABSTRACT

A wireless communication apparatus performs communication while changing frequencies according to a frequency hopping pattern, using a memory for storing a plurality of frequencies and designating a frequency to be used in the communication out of the stored plurality of frequencies stored in said memory means based on a first frequency hopping pattern. Depending on whether error is detected in information including data based on a second frequency hopping pattern and transmitted from another wireless communication apparatus, a frequency may be rewritten in the memory. Alternatively, time information in each received frame can be counted or not for use in reading out frequency information from a memory.

44 Claims, 15 Drawing Sheets

WIRELESS COMMUNICATION APPARATUS USING FREQUENCY HOPPING, AND METHOD OF CONTROLLING THE APPARATUS

BACKGROUND OF THE INVENTION

The present invention relates to frequency changeover when performing wireless communication using frequency hopping.

In a wireless communication system performing wireless communication using frequency hopping, an originating terminal and a destination terminal change to the same frequency for communication by using the following two methods. In the first method, the originating terminal transmits information on the frequency to be used in the next communication frame and information on when to change (i.e., information on a frequency to be "hopped" and the changeover time when changing to that frequency) in each communication frame, then the destination terminal changes the frequency in accordance with the received information. In the second method, the originating terminal and the destination terminal store an identical hopping pattern, synchronize to each other, then change the frequencies at the same timing.

In the first method, however, their information in each communication frame is not always received without an error. If an error occurs in the information of the received communication frame, the destination station can not obtain information on the frequency to be used and information on time of changing the frequency, thereby the destination terminal can not follow frequency changeover thereafter.

In the second method, the originating terminal and the destination terminal store the identical hopping pattern and synchronize timing to change frequencies by synchronizing to each other. If any frequency or frequencies used in the hopping pattern become useless because of noises, for example, it is not impossible to replace the useless frequencies. Accordingly, there are problems in which it may become even impossible to communicate depending upon the number of useless frequencies, and substantial drop in transmission rate because the number of times for resending information which were not communicated increases.

SUMMARY OF THE INVENTION

The present invention has been made in consideration of the above situation, and has as its object to definitely perform frequency changeover in frequency hopping.

Further, it is another object of the present invention to make it possible to change frequency even in a case where an error occurred in control information transmitted from an originating station.

Furthermore, it is still another object of the present invention to prevent the transmission rate from falling in a case where a frequency or frequencies are replaced during communication.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

<First Embodiment>

(Explanation of Each Unit)

Figure 1:
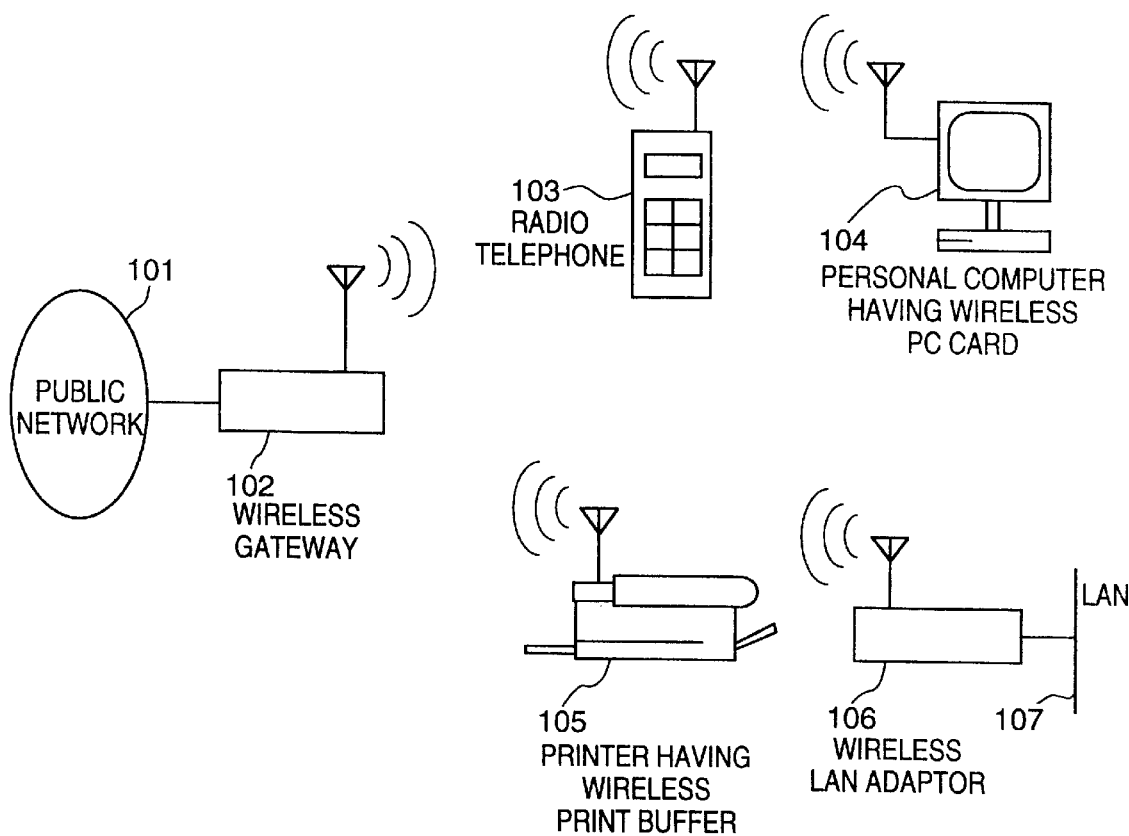
FIG. 1 is an explanatory view showing a configuration of a wireless communication system of the present invention.

FIG. 1 is an explanatory view showing a configuration of a wireless communication system of the present invention. In FIG. 1, reference numeral 101 denotes a public network; 102, a wireless gateway having a public line interface; 103, a radiotelephone; 104, a personal computer to which a wireless PC card is connected; 105, a printer to which a wireless print buffer is connected; 106, a wireless LAN adopter having an Ethernet interface; and 107, a LAN.

Among the above terminals, an arbitrary one functions as a controlling station (or Central Station, and referred as "CS", hereinafter). The terminal which becomes the CS generates a reference timing signals for synchronizing a transmission of a frame, performs control of a call, and administrates and assigns hopping patterns. The other terminals (called "personal station", or "PS", hereinafter) perform operations in accordance with the timing signal generated by the CS, and request the CS to make a call and to assign a hopping pattern upon starting communication.

Figure 2:
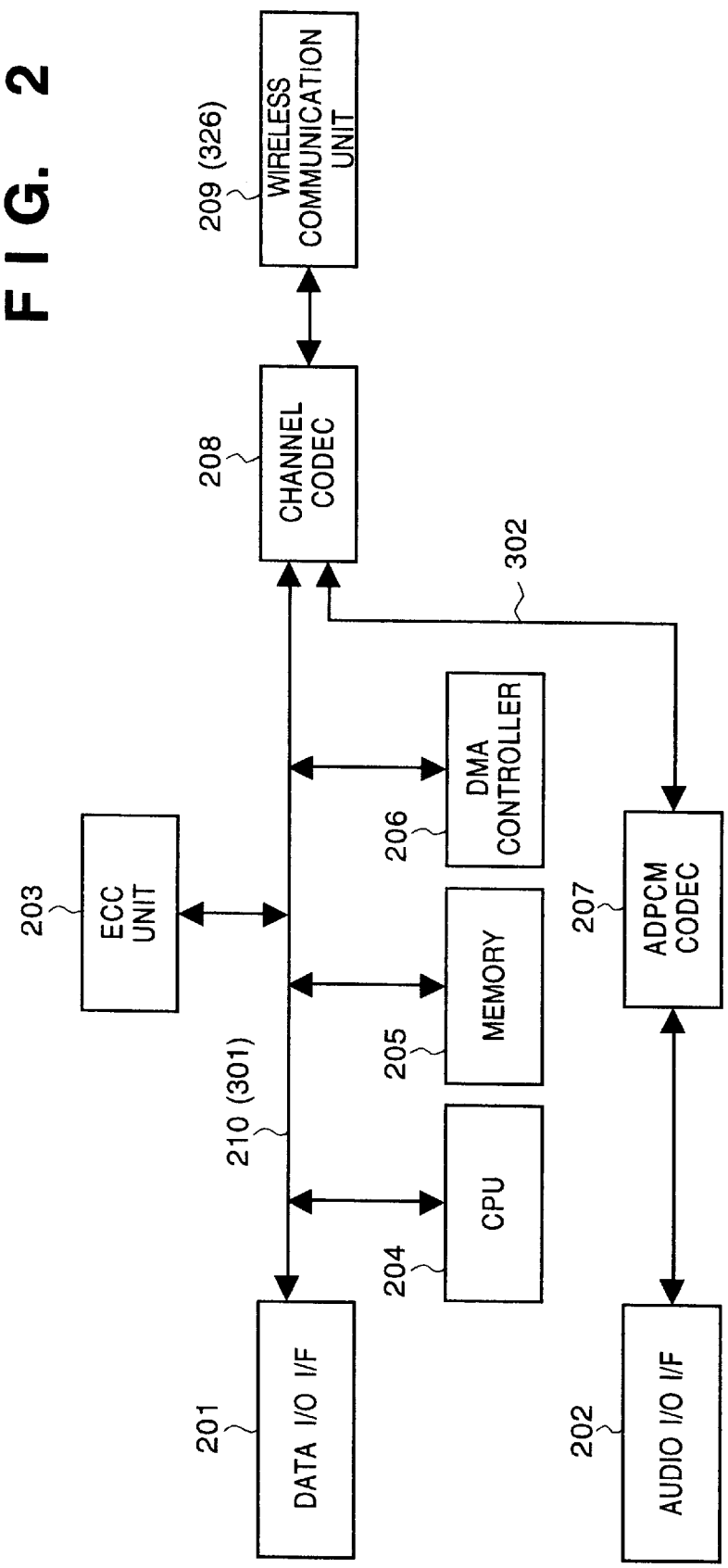
FIG. 2 is a block diagram illustrating a configuration of a wireless control unit of the present invention.

FIG. 2 is a block diagram illustrating a configuration of a CS or PS as a wireless control unit. In FIG. 2, reference numeral 201 denotes a data input/output interface (I/O I/F), such as a PCMCIA (Personal Computer Memory Card international Association) interface, a centronics interface, and an Ethernet interface; 202, an audio input/output interface (I/O I/F), such as a handset interface and a public network interface; 203, an error checking and correcting (ECC) unit; 204, a CPU; 205, a memory; 206, a direct memory access (DMA) controller; 207, an adaptive differential pulse code modulation (ADPCM) codec; 208, a channel codec; 209, a wireless communication unit; and 210, a data bus. Control of hopping patterns which is a main concern of the first embodiment is performed by the channel codec 208.

Figure 3:
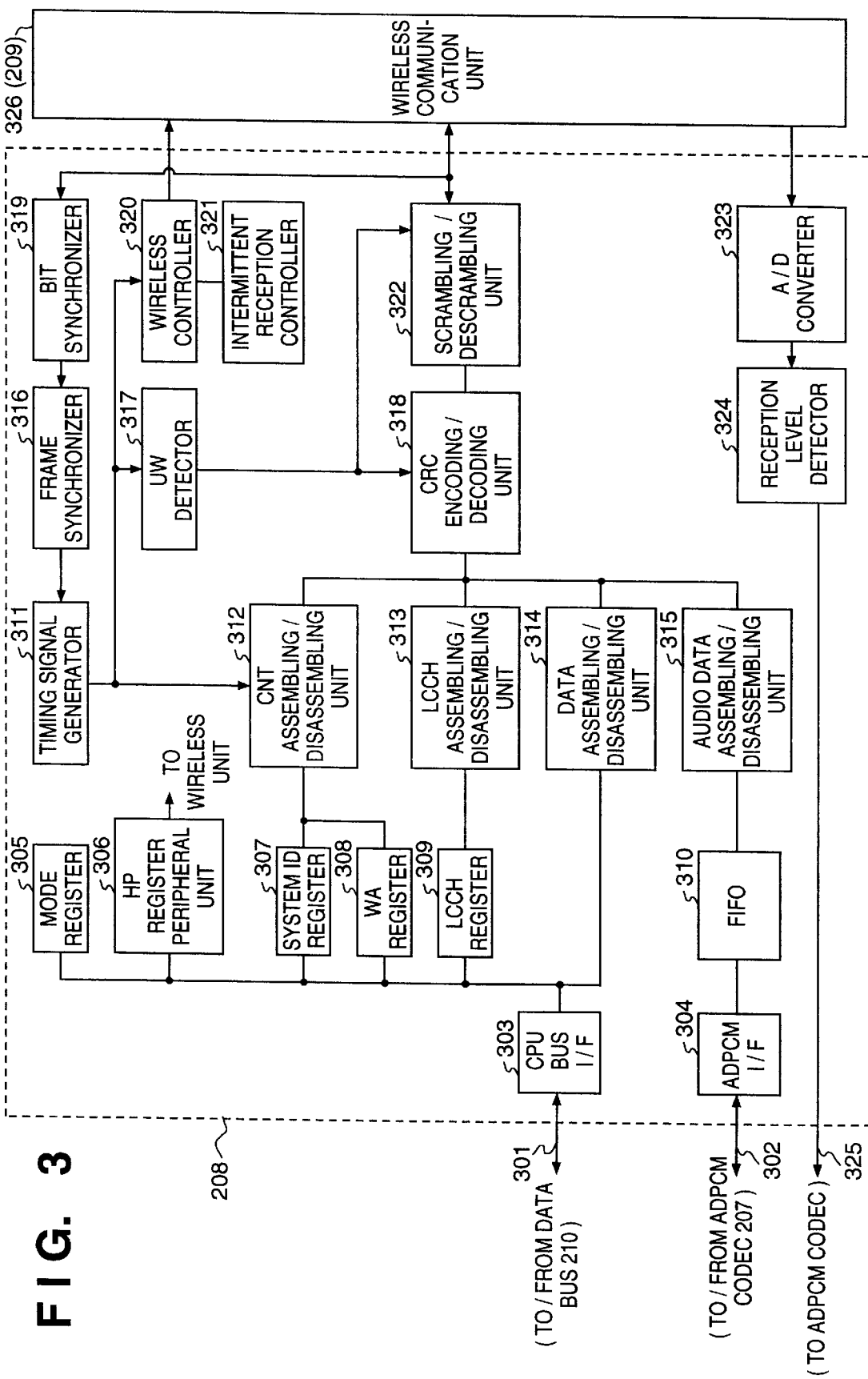
FIG. 3 is a block diagram illustrating a configuration of a channel codec of the present invention.

FIG. 3 is a block diagram illustrating an internal configuration of the channel codec 208. The channel codec 208 has a function of assembling audio and other data inputted from the audio I/O I/F 202 and the data I/O I/F 201 into a predetermined frame format and disassembling a frame into audio and other data and sending these data to the audio I/O I/F 202 and the data I/O I/F 201.

In FIG. 3, reference numeral 301 denotes a CPU data bus; 302, audio data coded in ADPCM; 303, a CPU bus interface (I/F); 304, an ADPCM interface (I/F); 305, a mode register for setting an operation mode; 306, a hopping pattern register peripheral unit; 307, a system ID register; 308, an intermittent activated terminal address (WA) register; 309, a logic control channel (LCCH) register; 310, a FIFO (First-In First-Out) buffer; 311, a timing signal generator; 312, a system control (CNT) channel assembling/disassembling unit; 313, a LCCH assembling/disassembling unit; 314, a data assembling/disassembling unit; 315, an audio data assembling/disassembling unit; 316, a frame synchronizer; 317, a unique word (UW) detector; 318 a cyclic redundancy check (CRC) encoding/decoding unit; 319, a bit synchronizer; 320, a wireless controller; 321, an intermittent reception controller; 322, a scrambling/descrambling unit; 323, an analog-digital (A/D) converter; 324, a reception level detector; 325 an interruption signal; and 326, a wireless communication unit.

Figure 4:
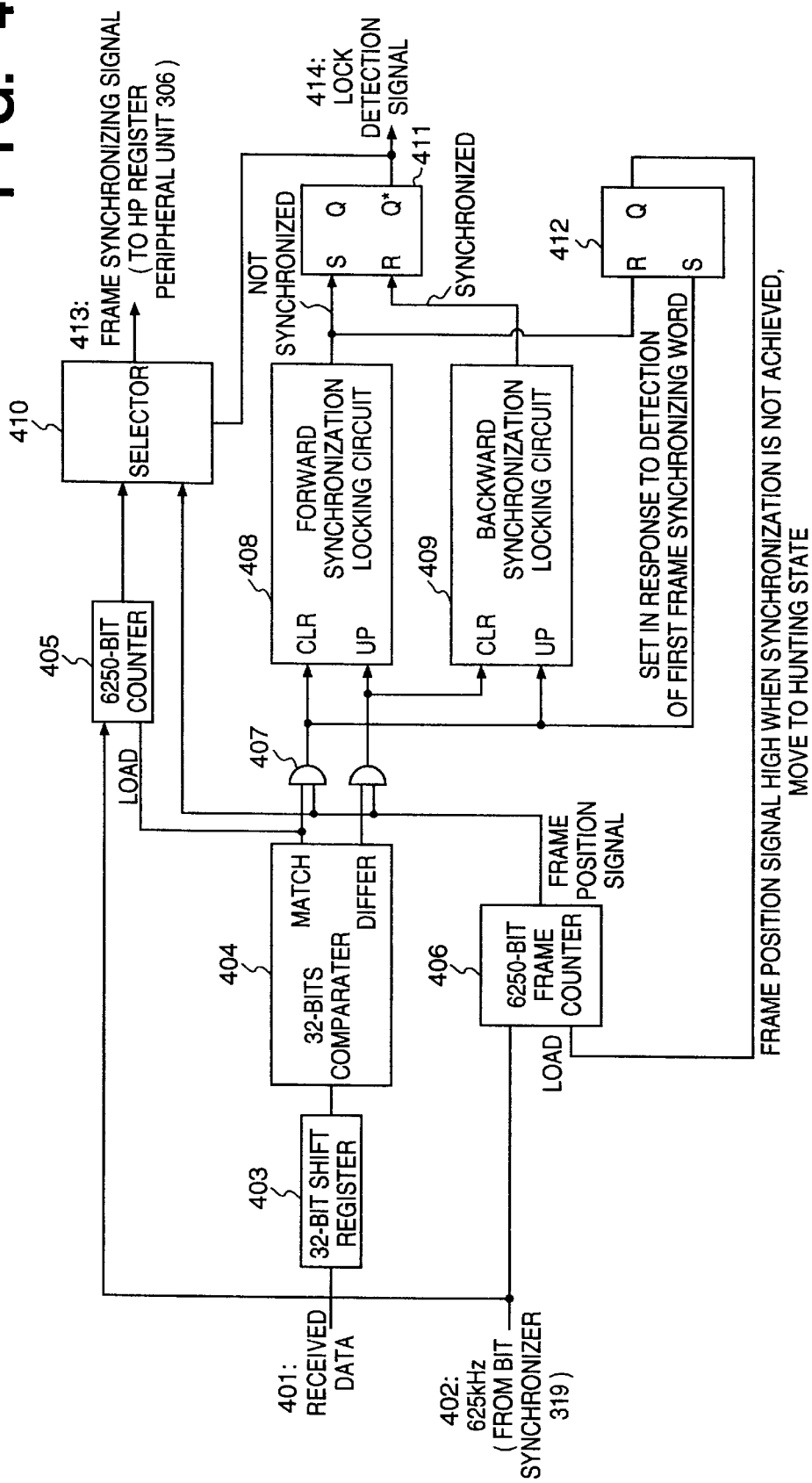
FIG. 4 is a block diagram illustrating a configuration of a frame synchronizer.

FIG. 4 is a block diagram illustrating a detailed configuration of the frame synchronizer 316. In FIG. 4, reference numeral 401 denotes received data; 402, a clock signal of 625 kHz from the bit synchronizer 319; 403, a 32-bit shift register (serial/parallel converter); 404, a 32-bit comparator; 405, a 6250-bit counter; 406, a 6250-bit frame counter; 407, a logic gate for gating a frame synchronizing word detection; 408, a forward synchronization locking circuit; 409, a backward synchronization locking circuit; 410, a selector; 411 and 412, SR latches; 413, a frame synchronizing signal to be outputted to the hopping pattern register peripheral unit 306.

Figure 5:
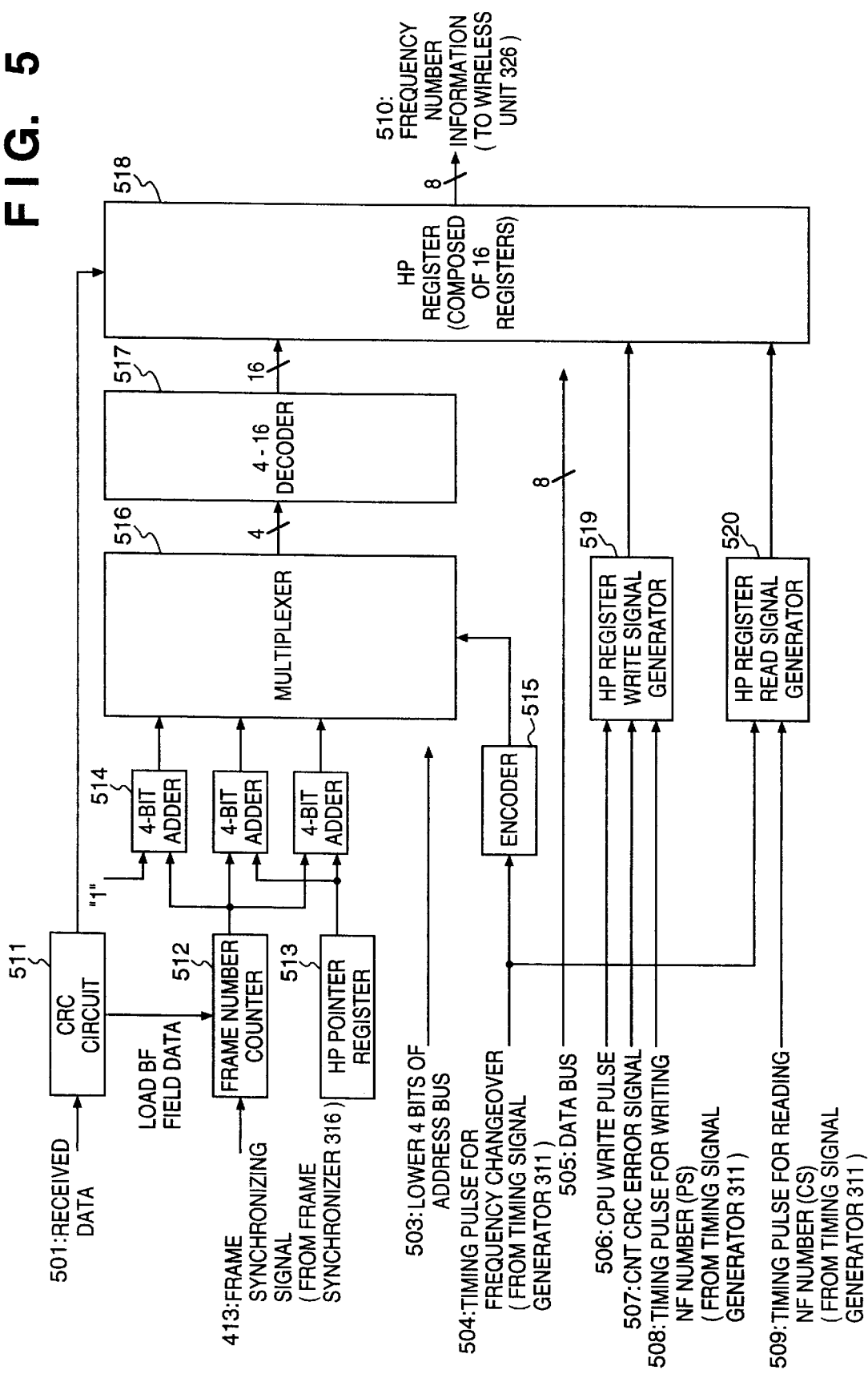
FIG. 5 is a block diagram illustrating hopping pattern registers and their peripheral units according to the first embodiment.

FIG. 5 is a block diagram illustrating a detailed configuration of the hopping pattern register peripheral unit 306. In FIG. 5, reference numeral 501 denotes received data; 413, the frame synchronizing signal outputted from the frame synchronizer 316; 503, lower four bits of an address bus from the CPU bus I/F 303; 504, a timing pulse from the timing signal generator 311 for frequency changeover; 505, a data bus from the CPU bus I/F 303; 506, a CPU write pulse; 507, a CRC error signal from a CRC circuit 511; 508, a timing pulse from the timing signal generator 311 for writing the next frequency (NF) number; 509, a timing pulse from the timing signal generator 311 for reading the NF number; 510, frequency number information for the wireless communication unit 326 to change a frequency; 511, the CRC circuit; 512, a frame number counter; 513, a hopping pattern (HP) pointer register; 514, a 4-bit adder; 515, an encoder; 516, a multiplexer; 517, a 4–16 decoder; 518, a hopping pattern (HP) register composed of sixteen registers; 519, a hopping pattern (HP) register write signal generator; and 520, a hopping pattern (HP) register read signal generator.

Figure 6:
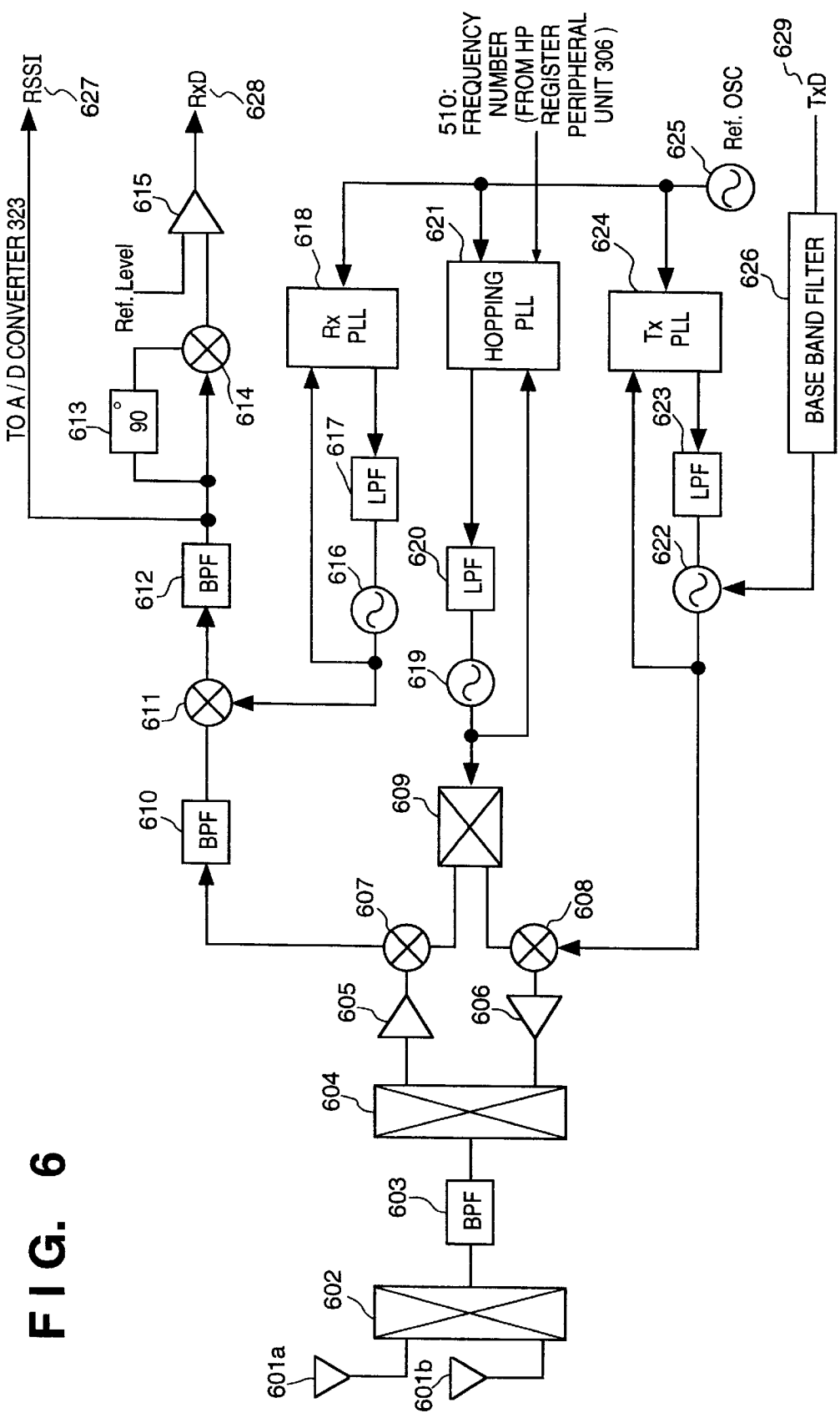
FIG. 6 is a block diagram illustrating a configuration of a wireless communication unit.

FIG. 6 is a block diagram illustrating a configuration of a wireless communication unit. In FIG. 6, 601*a* and 601*b* denote antennas for transmission and reception; 602, a switch for switching between the antenna 601*a* and the antenna 601*b*; 603, a band-pass filter (BPF) for removing signals in an unnecessary frequency band; 604, a send/receive switch; 605, an amplifier for reception; 606, an amplifier for transmission and reception (with power control); 607, a first IF (Intermediate Frequency) down-converter; 608, an up-converter; 609, a send/receive switch; 610, a BPF for removing signals in an unnecessary frequency band from signals converted by the down-converter 607; and 611, a second IF down-converter. The two down-converters 607 and 611 implement double-conversion reception.

Further, reference numeral 612 denotes a BPF for the second IF; 613, a quadrature phase shifter; and 614, a quadrature detector for detecting and demodulating a signal received by the BPF 612 and the quadrature phase shifter 613. Further, reference numeral 615 denotes a comparator for waveshaping; 616, a voltage controlled oscillator (VCO) for reception; 617, a low-pass filter (LPF); and 618, a phase-locked loop (PLL) which comprises a programmable counter, a pre-scaler, and a phase comparator. The VCO 616, the LPF 617 and the PLL 618 configure a frequency synthesizer for reception.

Further, reference numeral 619 denotes a VCO for carrier signal generation; 620, a LPF; and 621, a PLL which comprises a programmable counter, a pre-scaler, and a phase comparator. The VCO 619, the LPF 620, and the PLL 621 configure a frequency synthesizer for frequency hopping. The frequency number information 510 to be outputted to the hopping pattern register 518 in the channel codec 208 is inputted to the PLL 621, and hopping operation is performed. Further, reference numeral 622 denotes a VCO, having a modulation function, for transmission; 623, a LPF; and 624, a PLL which comprises a programmable counter, a pre-scaler, and a phase comparator. The VCO 622, the LPF 623, and the PLL 624 configure a frequency synthesizer for transmission having a frequency modulation function. Reference numeral 625 denotes a reference clock oscillator which provides a reference clock to the PLLs 618, 621 and 624; 626, a filter for limiting frequency band of transmission data (base-band signal); 627, a received signal for carrier sensing; 628, received data which is demodulated from the received signal; and 629, transmission data.

Figure 7:
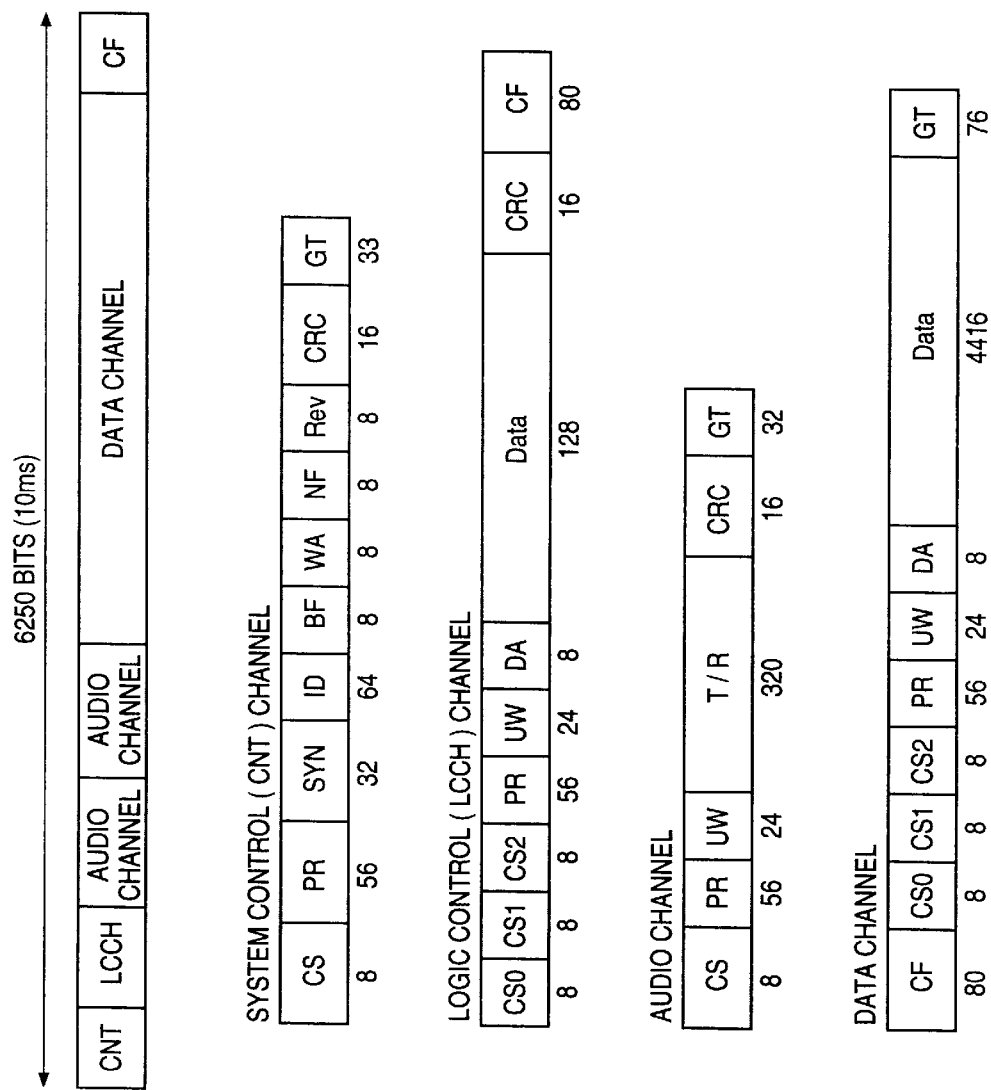
FIG. 7 shows configuration of wireless transmission frames of the present invention.

FIG. 7 shows wireless transmission frames to be used in this system. One frame has a length of 6250 bits (10 ms), and configured with five channels corresponding to time-division multiplexed channels, i.e., a channel used as a system control (CNT) channel (simply called as "CNT channel", hereinafter), a channel used as an logic control (LCCH) channel (simply called as "LCCH channel", hereinafter), two channels used as two audio channels (simply called as "audio channels", hereinafter), and a channel used as a data channel (simply called as "data channel", hereinafter), and three frequency changeover periods.

The CNT channel has a carrier sense (CS) field, a preamble (PR) field, a frame synchronizing word (SYN) field used by terminals for maintaining frame synchronization, an ID field for receiving data only from a CS in the same system, a frame number information (BF) field which is used for controlling hopping patterns and contains information about time used for transmitting a frame, an intermittent terminal activation address (WA) field for activating a terminal receiving data intermittently, a next frame frequency number (NF) field for updating the hopping pattern register 518, a cyclic redundancy check (CRC) field for detecting errors in fields from the ID field to a Rev field, and a guard time (GT) field.

The LCCH channel includes carrier sense fields (CS0, CS1 and CS2), a preamble (PR) field, a unique word (UW) field, a destination address (DA) field, an LCCH control data (Data) field, a CRC field, and a frequency changeover (CF) field.

The audio channel has a carrier sense (CS) field, a preamble (PR) field, a unique word (UW) field, an audio data (T/R) field, a CRC field, and a guard time (GT) field.

The data channel includes a frequency changeover (CF) field, carrier sense fields (CS0, CS1 and CS2), a preamble (PR) field, a unique word (UW) field, a destination address (DA) field, a data (Data) field, and a guard time (GT) field.

Figure 8:
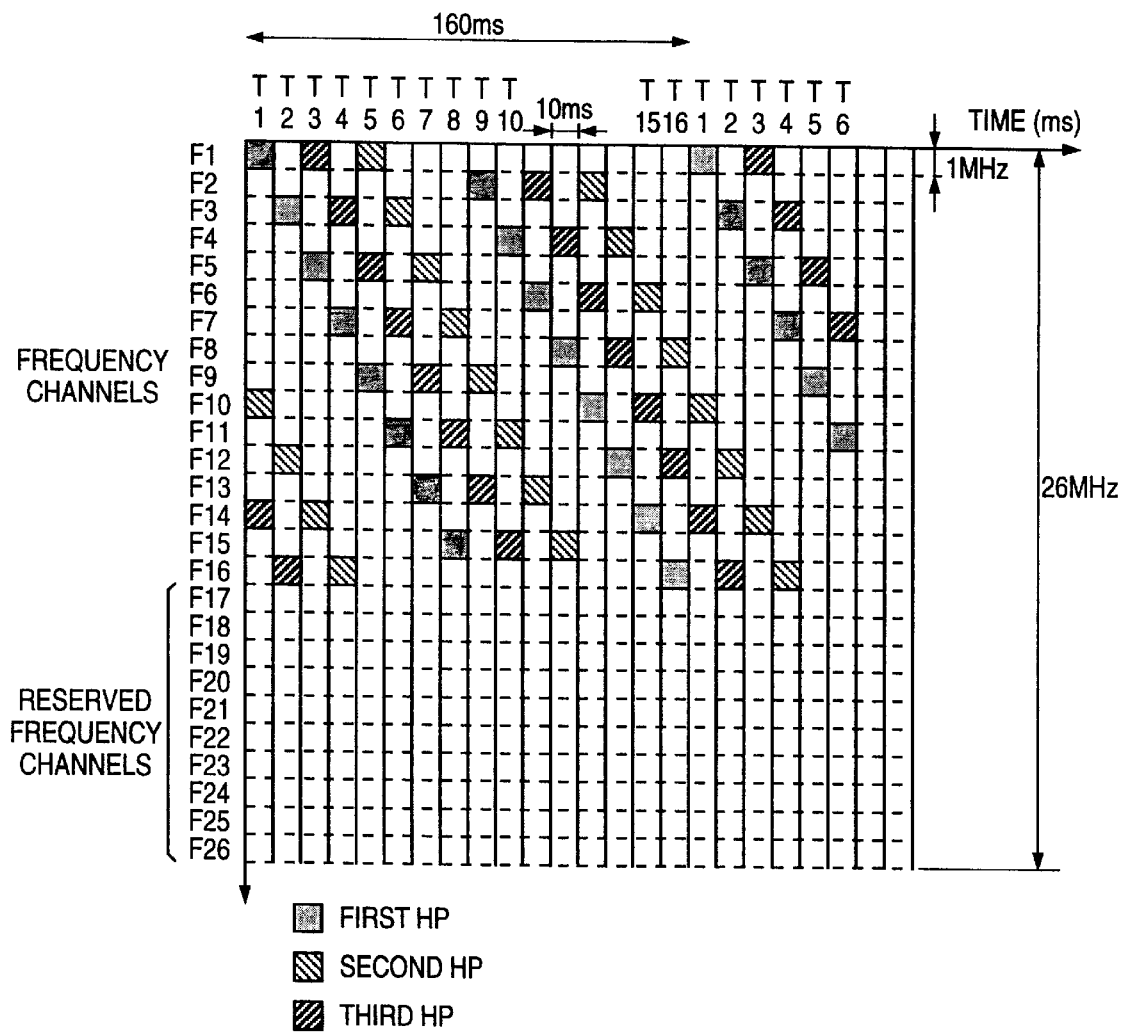
FIG. 8 is an explanatory view showing frequency hopping of the present invention.

FIG. 8 is a conceptual view of frequency hopping used in the system described above.

In the system of the first embodiment, 26 frequency channels each of which has 1 MHz band width are used. In consideration of a case where there are useless frequency channels because of interference noises, 16 frequency channels out of 26 frequency channels are selected, and the selected frequency channels are used in a predetermined order for frequency hopping.

In this system, one frame has a length of 10 ms, and frequency channel is hopped every frame. Therefore, the period of a hopping pattern is 160 ms.

In FIG. 8, different hopping patterns are shown by different pattern designs. In general, hopping patterns (HP) are used so that the same frequency channel is not used by a plurality of stations in each frame, therefore, it is possible to prevent occurrence of a data error.

In this system, further, the first hopping pattern is used for the CNT channel and the LCCH channel, the second hopping pattern is used for the audio channels, and the third hopping pattern is used for the data channel, so that respective channels do not use the same frequency channels in the same frame. Accordingly, it is possible to transmit and receive data to/from different terminals in respective channel.

Note, in order to reduce the number of hopping patterns to be stored in the channel codec 208, hopping patterns used for respective channels in the frame are generated by time-shifting a pattern obtained by arranging frequency channels in a predetermined order.

Figure 9:
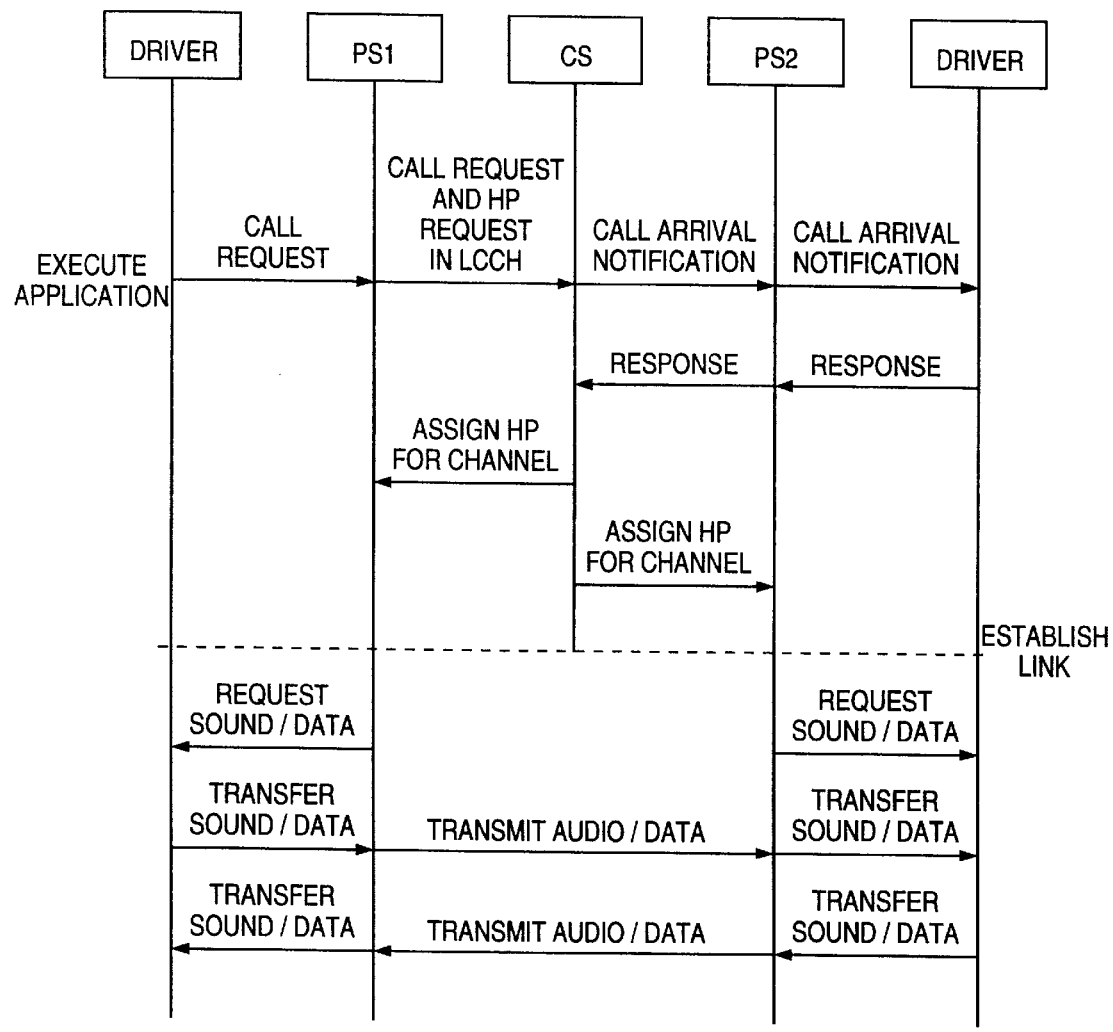
FIG. 9 is an explanatory view showing a sequence for opening communication of the present invention.

FIG. 9 is an explanatory view showing a sequence in which the first PS makes a call to the second PS in this system.

(Explanation of Operation)

<<Basic Sequence>>

First, a basic communication sequence will be explained. FIG. 9 shows an example of the sequence.

All the terminals in the system, other than the CS, always receive the CNT channel from the CS, and thus operate in synchronization with the CS. When application of a PS is executed under the above situation to perform audio or data communication with the CS or another PS, the LCCH channel is used to make a request to the CS to start communication in prior to opening communication with another PS, and the PS receives an available hopping pattern from the CS in the LCCH channel.

When receiving a hopping pattern from the CS, the PS sets the hopping pattern to the hopping pattern register 518 of the channel codec 208. Then, the PS performs communication while changing frequencies for the audio or data channels in accordance with the hopping pattern in accordance with designation by the channel codec 208. Note, audio data and other data are inputted or outputted from/to the audio I/O interface 202 and the data I/O interface 201, respectively.

In a case shown in FIG. 9, the PS1 transmits a call request and a hopping pattern assignment request to the CS in the LCCH channel in order to open communication with the PS2. The CS informs the PS2 of a receipt of a call in the LCCH channel. When the CS receives a response from the PS2, it assigns a hopping pattern or patterns and a channel or channels (i.e., audio channel or data channel) to be used to the PS1 and the PS2.

<<Operation Timing>>

A method of performing communication, as described above, without errors by using frequency hopping will be described below in detail.

Operation timing of the channel codecs 208 of the PS1 and PS2 which are communicating is synchronized by synchronizing to the CNT channel which is transmitted in accordance with a timing signal generated by the timing signal generator 311 in the CS. The timing signal generator 311 in the CS includes a 6250-bit counter, and it generates a pulse signal of 1 clock duration (1.6 $\mu$sec) every 100 ms. The CS assembles a frame including the CNT channel in accordance with the timing signal and transmits it.

The PS which received the CNT channel in a frame generates the frame synchronizing signal 413 which is little affected by external noises in the frame synchronizer 316 by using a frame synchronizing word (SYN in FIG. 7) included in the CNT channel.

Figure 10:
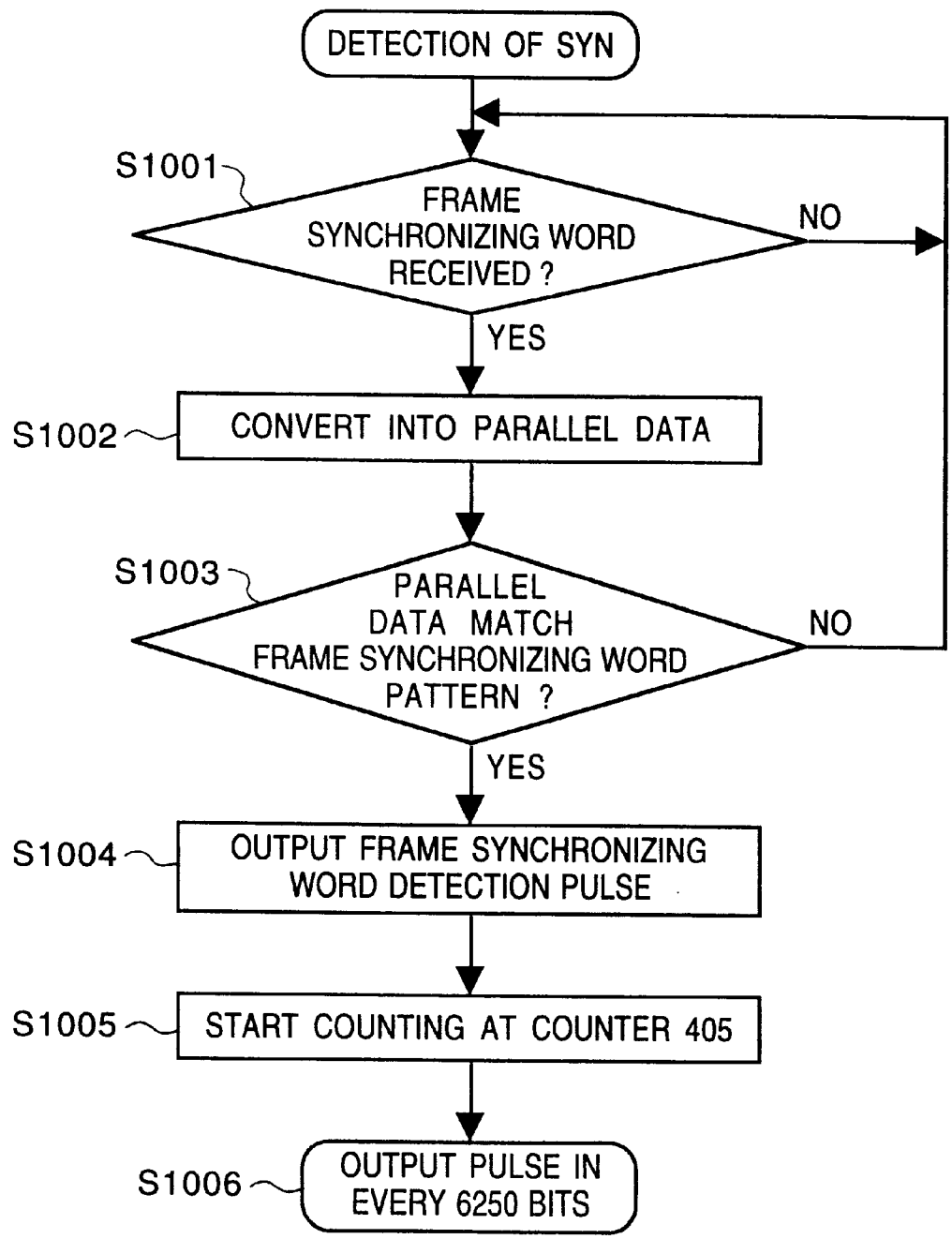
FIG. 10 is a flowchart showing an operation of a frame synchronization detection of the present invention.
Figure 11:
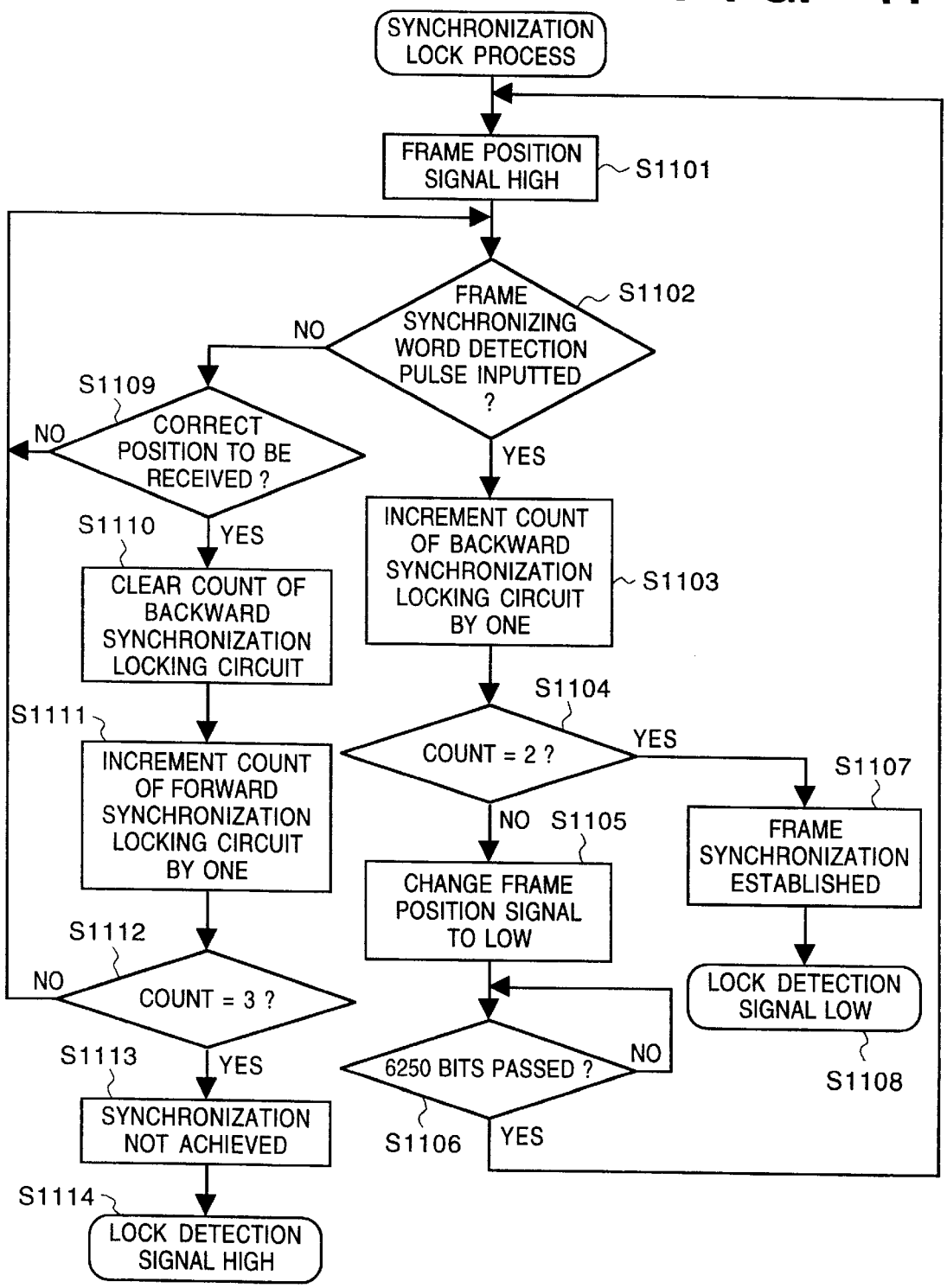
FIG. 11 is a flowchart showing an operation for locking a frame synchronization of the present invention.
Figure 12:
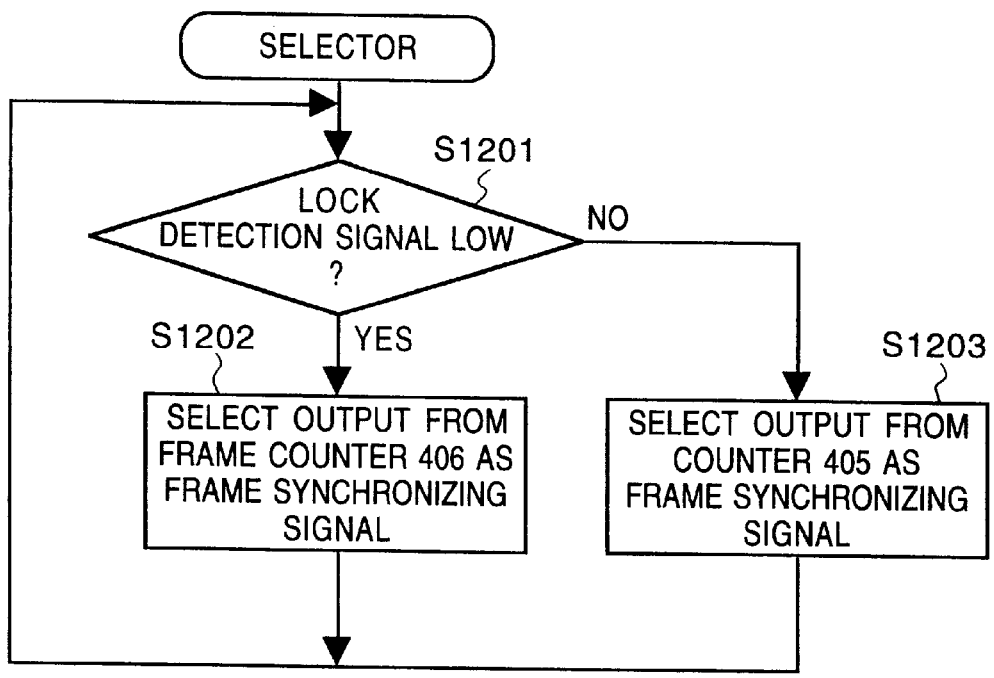
FIG. 12 is a flowchart showing an operation of a selector of the present invention.

The aforesaid operation will be explained in more detail with reference to FIGS. 10, 11, and 12. The received frame synchronizing word (SYN) (step S1001 in FIG. 10) is converted into parallel 32-bit data in the 32-bit shift register 403 (step S1002). The data is compared with a pattern of the frame synchronizing word by the 32-bit comparator 404. If they match ("Yes" at step S1003), a frame synchronizing word detection pulse signal having a pulsewidth of 1 clock period is generated by the 32-bit comparator 404 (step S1004), and the pulse causes a predetermined value loaded to the counter 405. Then, the counter 405 outputs a pulse signal every 6250 bits (step S1006), and the pulse signal is inputted to the selector 410.

Further, the frame counter 406 is a counter for maintaining the correct position of the frame synchronizing word, and it outputs a frame position signal (High level=5V) at the correct position of the frame synchronizing word. When the frame position signal from the frame counter 406 is high level (step S1101 in FIG. 11) and the frame synchronizing word detection pulse is outputted by the 32-bit comparator 404, then it is known that the frame synchronizing word is detected ("Yes" at step S1102), and the backward synchronization locking circuit 409 increments the count by one (step S1103). If frame synchronization is not achieved, the frame position signal from the frame counter 406 becomes a hunting state in which the frame position signal is fixed to high level. Therefore, if the frame synchronizing word is acknowledged by the 32-bit comparator 404 when frame synchronization is not achieved, the backward synchronization locking circuit 409 always starts counting and increments the count to one.

When the frame synchronizing word is detected once, as described above, the hunting state of the frame counter 406 is released, and the frame counter 406 changes the frame position signal to a low level (0V) for 6250 bits (step S1105). Then, at the position at which the frame synchronizing word of the next frame is to be received (i.e., 6250 bits later) (step S1106), the frame counter 406 changes the frame position signal to a high level (step S1101). If a frame synchronizing word detection pulse is outputted from the 32-bit comparator 404 at this point, then it is assumed that the frame synchronizing word is detected, and the backward synchronization locking circuit 409 increments the count by one. When the frame synchronizing word is detected in two consecutive frames (step S1104), then it is assumed that frame synchronization is achieved (step S1107), and the SR latch 411 is reset and a lock detection signal is set to low Level (step S1108).

Meanwhile, if the frame position signal is high level, and if no frame synchronizing word detection pulse is outputted from the 32-bit comparator 404 at the correct receiving position of a frame synchronizing word (every 6250 bits) (step S1109), then it is assumed that it is failed to receive a frame synchronizing word and the backward synchronization locking circuit 409 is cleared (step S1110), as well as the forward synchronization locking circuit 408 starts counting and increments the count to one (step S1111). In a case where a frame synchronizing word is not detected at correct position in three consecutive frames (step S1112), it is assumed that frame synchronization is lost, and the SR latch 411 is set and the lock detection signal is set to high level (step S1113).

The lock detection signal is used to control the selector 410. As shown in FIG. 12, the selector 410 selects output from the frame counter 406 as a frame synchronizing signal (step S1202) during achievement of frame synchronization, namely, during the period when the lock detection signal is low level ("Yes" at step S1201). Whereas, the selector 410 selects output from the counter 405 as a frame synchronizing signal (step S1203) during the period when frame synchronization is not achieved, namely, during the lock detection signal is high level ("No" at step S1201). This is because the counter 405 outputs a pulse signal every 6250 bits regardless of success or failure of detecting frame synchronizing word, and it is possible to continue generating a frame synchronizing signal 413 by substitutionally using the output from the counter 405 even when frame synchronization is not achieved.

By using the aforesaid frame synchronizing locking circuits, it is possible to prevent mistakenly recognizing data having the same pattern as that of a frame synchronizing word existing at a position other than a predetermined position (e.g., in the audio channel) as a frame synchronizing word. Further, in a case where the frame synchronizing word is not received correctly, it is possible to continue frequency hopping operation at a right timing, as will be described later, by generating the frame synchronizing signal 413 constantly.

<<Operation for Following Hopping Pattern>>

Control of the operation for following a hopping pattern is performed by using data in the BF field and NF field of the CNT channel transmitted from a CS. After being reset, all of the registers composing the hopping pattern register 518 of a PS have a predetermined frequency number, e.g. F1, and the PS is waiting for receiving a first frame by a frequency indicated by the frequency number. Whenever the PS has received data the PS follows a hopping pattern of the CS by reviewing a register of the hopping pattern register based on the received data of the BF field and NF field. Therefore, if the PS has received 16 frames successively, a hopping pattern in the hopping pattern register of the PS is the same as that of the CS. As mentioned above, the operation for following a hopping pattern is based on the data of the BF field and NF field.

However, it is happened that the data of the BF field is not received correctly. At the such case, a data in place of the data of the BF field can be generated by the frame number counter 512 based on a frame synchronizing signal generated from the frame synchronizer 316 so that the PS can follow the hopping patter of the CS. The output value of the frame number counter 512 of the PS is always the same as that of the CS, by loading a data of the BF field received correctly into the frame number counter of the PS.

The frame number counter 512 is a Hexadecimal counter corresponding to the number, 16, of the frequencies used in a single hopping pattern. The hopping pattern register 518 is basically composed of sixteen registers of 8-bit width, and the registers store respective frequency numbers which indicate sixteen frequency channels selected out of twenty-six frequency channels. The registers can be read and written by the CPU, and a register at an address, the sum of an output value from the frame number counter 512 and a predetermined value, can be read and written in accordance with the timing pulse 504 for frequency changeover in a frame.

Note, the output from the frame number counter 512 is information representing a time period (i.e., T1 to T16) shown in FIG. 8.

Specific operations of the CS and the PS will be explained below.

In the CS, the frame number counter 512 continues counting on the basis of the frame synchronizing signal 413. When the output value from the frame number counter 512 is the frame number of the objective frame, the frame number information is converted into serial data at a predetermined timing, and transmitted as data of the BF field (FIG. 7).

After the frame number is added to 1 in the 4-bit adder 514, a signal which permits access to a register having an address corresponding to the "frame number+1" (i.e., register corresponding to the next frame number) is generated via the multiplexer 516 and the decoder 517. At the timing of transmitting data in the NF field, the register to which access is permitted is accessed for reading it, and the read data is converted into serial data and transmitted as data in the NF field.

Figure 13:
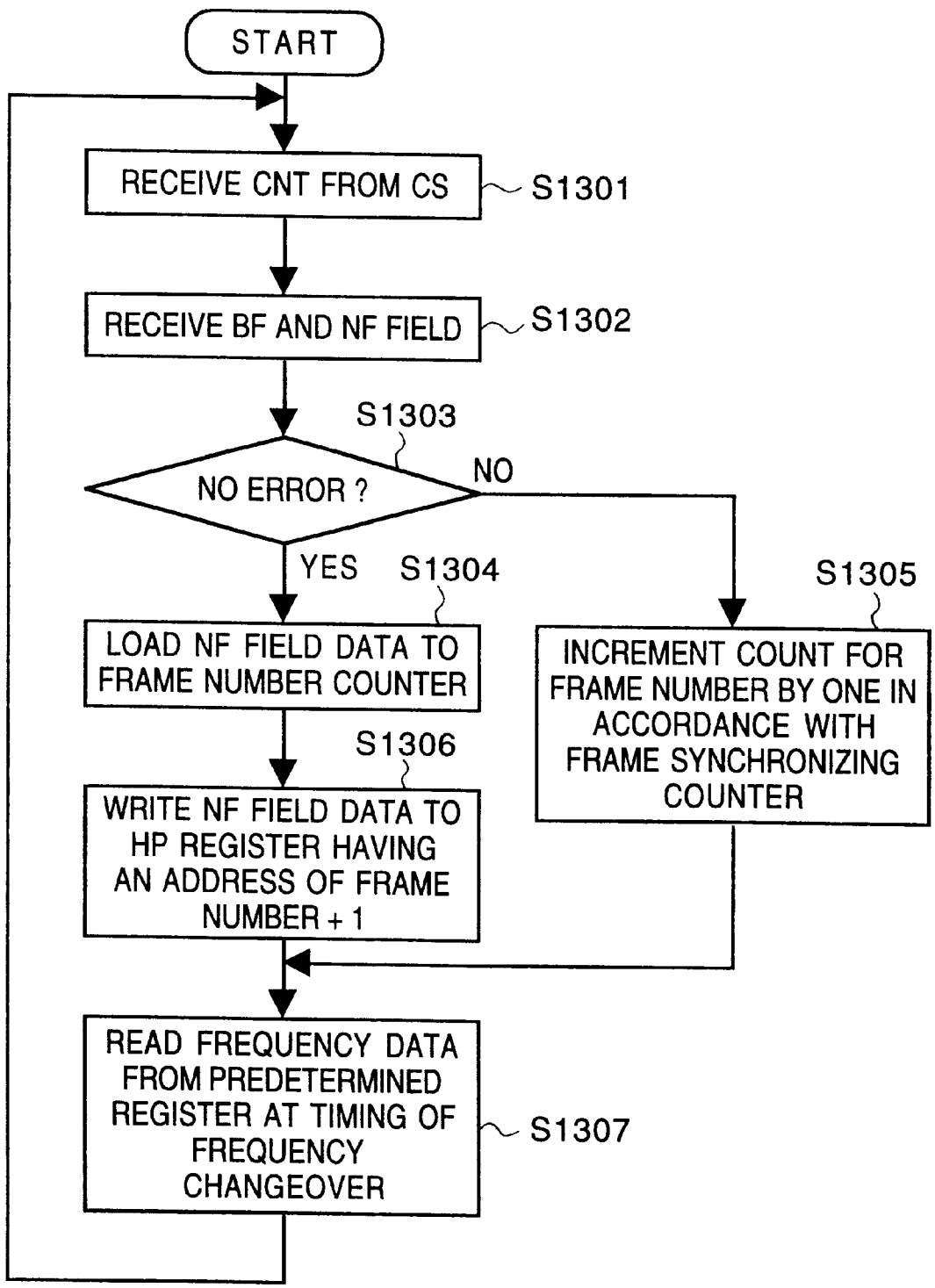
FIG. 13 is a flowchart showing an operation of the hopping pattern registers and their peripheral units according to the first embodiment.

As for a PS, when it receives the CNT channel (step S1301 in FIG. 13), it receives the BF field and the NF field in the CNT channel (step S1302). Then, it checks whether an error occurred or not in the received data in the CRC circuit 511 (step S1303). If there is no error, the CRC circuit 511 outputs data in the received BF field to the frame number counter 512 and data in the NF field to the hopping pattern register 518, and at the timing of the frame synchronizing signal 413, the data in the BF field is loaded to the frame number counter 512 (step S1304).

Accordingly, the data in the received BF field is outputted from the frame number counter 512, and a hopping pattern register having an address corresponding to "current frame number+1" is selected, similarly to the case of the CS. By writing the data in the received NF field to the selected hopping pattern register (step S1306), the hopping pattern register 518 of the PS are updated in accordance with the hopping pattern administrated by the CS, and the PS changes frequencies in accordance with the hopping pattern.

Further, in a case where there is an error in data in the received BF and NF fields ("No" at step S1303), the CRC circuit 511 does not output the received data, and no data is loaded to the frame number counter 512. As for a clock signal to the frame number counter 512, since the frame synchronizing signal 413 from the frame synchronizer 316 is inputted to the frame number counter 512, in a case no data is loaded to the frame number counter 512, it increments the count by one (step S1305). As a result of using the frame synchronizing signal 413 which is constantly generated regardless of the state of received data, it is possible to follow the same frame number as in the CS even when the BF field data is not received. Further, in a case where there is an error in the received data, the hopping pattern register 518 are not updated in order to prevent the wrong frequency number from being written in the hopping pattern register 518.

As described above, in a case where the data is received with no error, it is possible to always store the same hopping pattern as that used in the CS in the hopping pattern register 518 in a PS. Further, even in a case where frame number information is not correctly received by a PS, the frame synchronizing signal 413 is outputted from the frame synchronizer 316 of the PS in each frame, therefore, by incrementing the count by the frame number counter 512 of the CS in accordance with the frame synchronizing signal 413, it is possible for the PS to maintain the same frame number as that in the CS.

<<Explanation of Frequency Changeover Operation>>

In the system according to the first embodiment, time-shifted hopping patterns are used for the CNT and LCCH channels, the audio channels, and the data channel, shown in FIG. 7. Therefore, the system reads corresponding frequency number information from the hopping pattern register 518 at each frequency changeover period before each channel starts.

More specifically, the frame number outputted from the frame number counter 512 for each channel is added to a predetermined value, and the hopping pattern register 518 having an address corresponding to the obtained sum is accessed so as to read the data from the hopping pattern register 518.

The value to be added in the frequency changeover period before the beginning of the CNT channel is "1". This is for reading the frequency number corresponding to the next frame number. Further, the values to be added in the frequency changeover periods before the beginning of the audio and data channels are stored in the hopping pattern pointer register 513. The upper 4 bits of the hopping pattern pointer register 513 are for the audio channels, and the lower 4 bits are for the data channel, and either of the values of the upper and lower 4 bits is added in the frequency changeover period.

As described above, by using a hopping pattern, frequency hopping which is time-shifted for each channel is realized.

Note, a PS requests the CS to assign a hopping pattern before opening communication with another PS, and values to be stored in the hopping pattern pointer register 513 are controlled by the CS so that the same value is not assigned to the other PSs. Accordingly, it is possible for a plurality of PSs to communicate simultaneously without using the same frequency.

As described above, in a wireless communication system using frequency hopping which changes frequencies used during performing communication, it is possible to definitely follow frequency changeover even in a case where there is an error in received data. Accordingly, it is possible to realize a wireless communication system suitable for audio and image data communication, for real-time communication, in addition to data communication, which does not require real-time communication.

It should be noted that, in the first embodiment, in a PS, if there is no error in the received BF field data, the data is loaded to the frame number counter in any frames having any frequencies so that the frame number counter of the PS can follow the frame number counter of the CS.

However, it is possible to achieve the present advantage as described above without loading the BF field data in any frames, by setting a specific frame number to the frame number counter of the PS only when the specific frame number in the BF field is received with no error.

Further, it is also possible to achieve the same advantage as described above by resetting a frame number counter of a PS only when a specific frame number in the BF field is received with no error.

Further, the CS transmits frame number information and frequency number information, and a PS updates its hopping pattern register on the basis of the received information in the first embodiment. However, as for the frequency number information, it is possible to achieve the same advantage as described above without using the aforesaid transmission method with using BF field and NF field described in the first embodiment.

More specifically, if only a PS has a frame number counter, a method in which hopping pattern information to be replaced is transmitted from the CS to the PS in the LCCH channel may be used.

Furthermore, according to the first embodiment, the minimum number of the hopping pattern registers are used by shifting a hopping pattern to make hopping patterns for channels.

Further, it is possible to achieve the present advantage of following the hopping pattern even when hopping patterns are prepared independently for respective channels.

Further, according to the first embodiment, a hopping pattern using 16 frequencies is assumed, however, the present invention is not limited to this, and the number of the frequencies to be used in one hopping pattern may be other numbers. In addition, it is possible to use an arbitrary hopping pattern besides the one used in the first embodiment.

<Second Embodiment>

The configuration of a wireless communication system according to a second embodiment is similar to the one described in the first embodiment.

However, the hopping pattern register peripheral unit in the channel codec of the wireless controlling unit in the second embodiment differs from that of the first embodiment.

Other units and elements, and their operation in the second embodiment are the same as those described in the first embodiment, and explanation of those are omitted.

Figure 14:
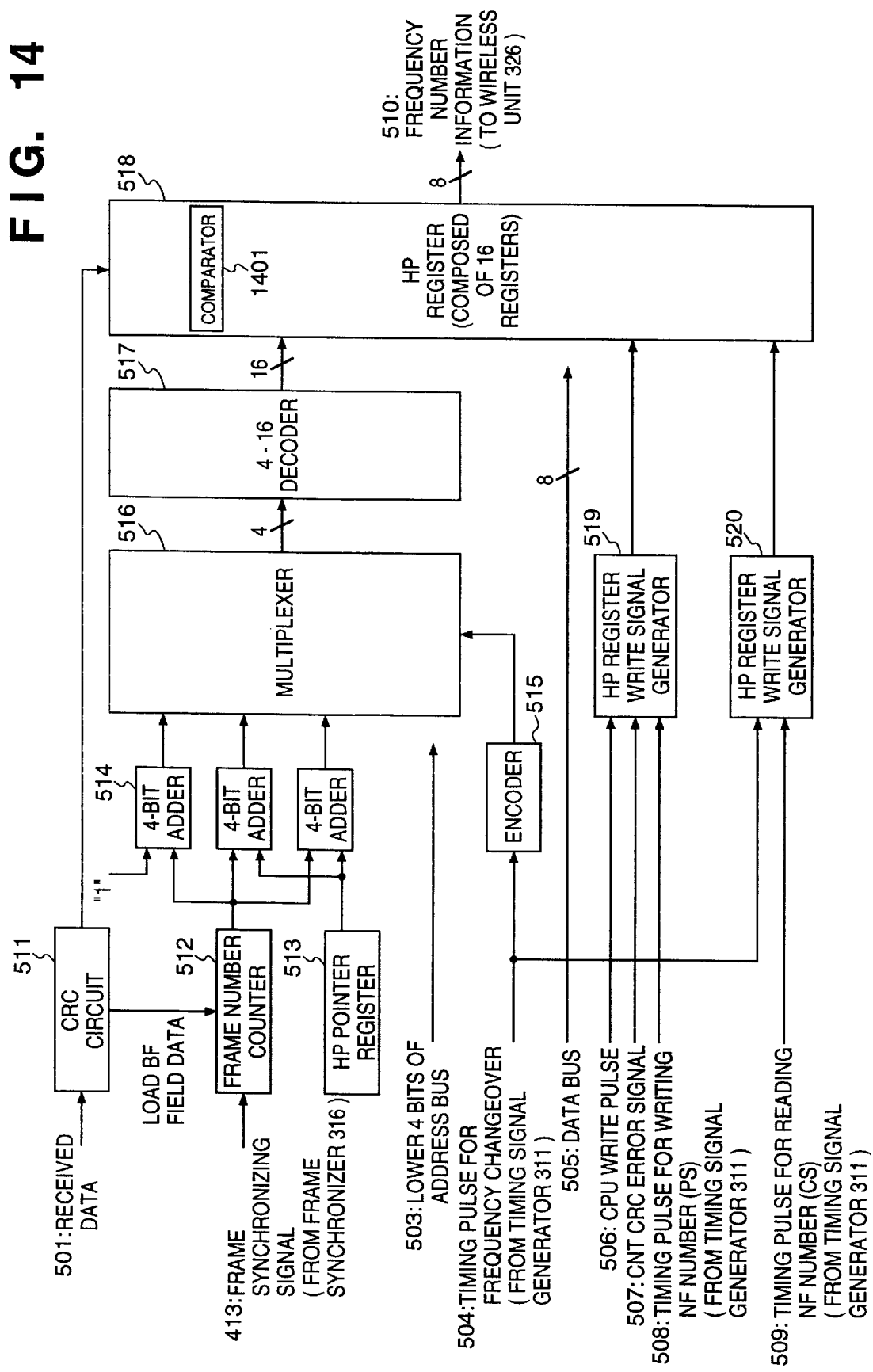
FIG. 14 is a block diagram illustrating a configuration of hopping pattern registers and their peripheral units according to a second embodiment.

FIG. 14 is a block diagram illustrating a configuration of a hopping pattern register peripheral unit 306 used in the second embodiment.

In FIG. 14, reference numeral 1401 is a comparator which compares a frequency number, stored in a hopping pattern register selected based on the BF field data outputted from the frame number counter 512, to data in the NF field sent from the CRC circuit 511, and inhibits writing the NF field data in the hopping pattern register when the frequency number and the NF field data match. Other units and elements are the same as those described with reference to FIG. 5, and explanation of those are omitted.

Note, in FIG. 14, one comparator 1401 is provided for the hopping pattern register 518, however, it is possible to configure the system so that a plurality of comparators are provided for respective sixteen registers of the hopping pattern register 518.

Figure 15:
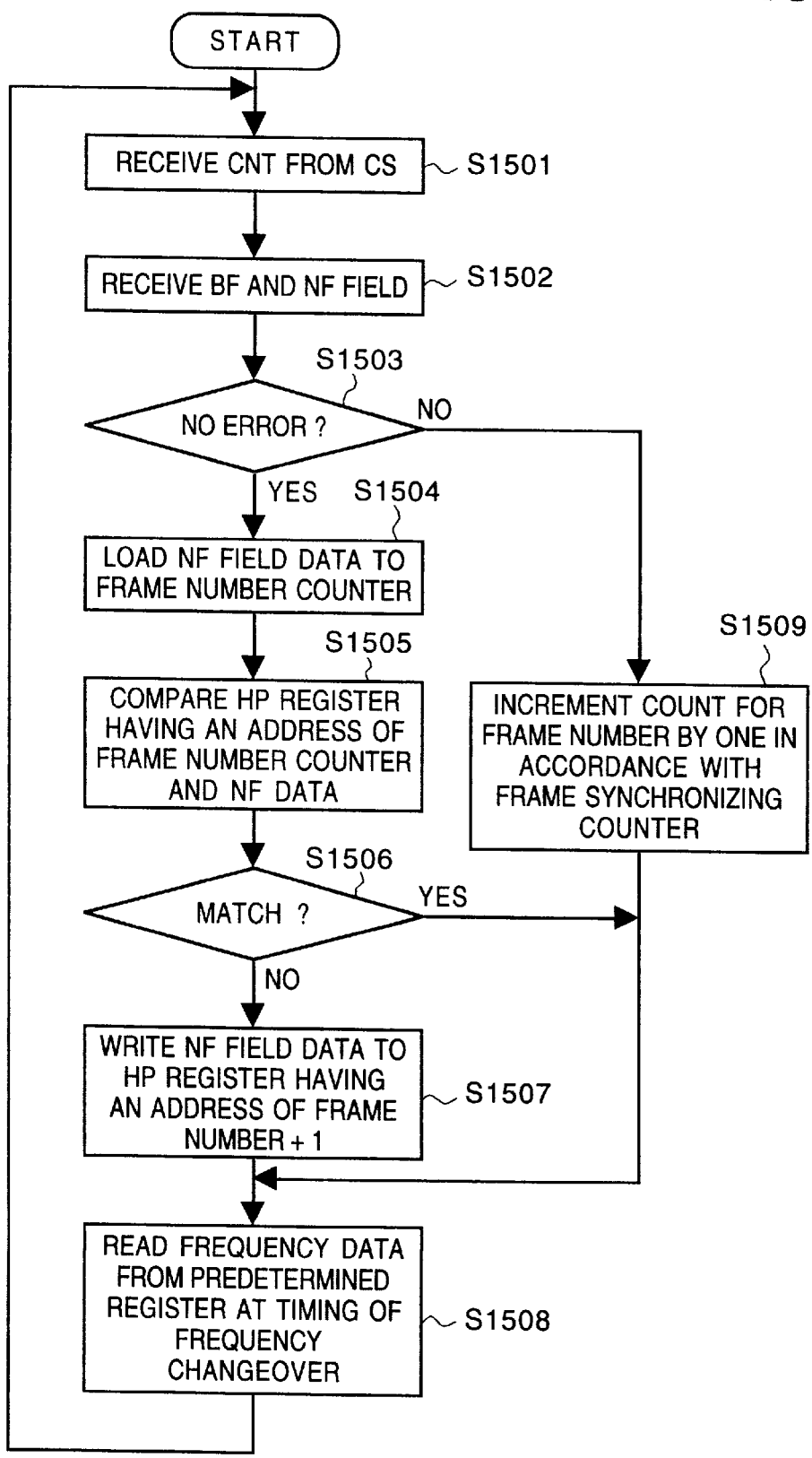
FIG. 15 is a flowchart showing an operation of the hopping pattern registers and their peripheral units according to the second embodiment.

FIG. 15 is a flowchart showing an operation of the hopping pattern register peripheral unit 306 according to the second embodiment.

Similarly to the first embodiment, control of the operation for following a hopping pattern when a frequency channel which is used in a hopping pattern become useless and the frequency channel is to be replaced is performed by using the frame number counter 512 and the hopping pattern register 518 on the basis of the frame synchronizing signal 413 generated by the frame synchronizer 316 in advance.

The frame number counter 512 is a Hexadecimal counter corresponding to the number, 16, of the frequencies used in a single hopping pattern. The hopping pattern register 518 are basically sixteen registers of 8-bit width, and the registers store respective frequency numbers which indicate sixteen frequency channels selected out of twenty-six frequency channels. The registers can be read and written by the CPU, and a register at an address, the sum of an output value from the frame number counter 512 and a predetermined value, can be read and written in accordance with the timing pulse 504 for frequency changeover in a frame.

Note, the output from the frame number register 512 is time period information (i.e., T1 to T16) shown in FIG. 8.

Specific operations of the CS and the PS will be explained below.

In the CS, the frame number counter 512 continues counting on the basis of the frame synchronizing signal 413. When the output value from the frame number counter 512 is the frame number of the objective frame, the frame number information is converted into serial data at a predetermined timing, and transmitted as data in the BF field (FIG. 7).

After the frame number is incremented by 1 in the 4-bit adder 514, a signal which permits to access to a register having an address corresponding to the "frame number+1" (i.e., register corresponding to the next frame number) is generated via the multiplexer 516 and the decoder 517. At the time of transmitting data in the NF field, the register to which access is permitted is accessed for reading, and the read data is converted into serial data and transmitted as data in the NF field.

As for a PS, when it receives the CNT channel (step S1501 in FIG. 15), it receives the BF field and the NF field in the CNT channel (step S1502). Then, it checks whether an error occurred or not in the received data in the CRC circuit 511 (step S1503). If there is no error, the CRC circuit 511 outputs data in the received BF field to the frame number counter 512 and data in the NF field to the hopping pattern register 518, and at a timing of the frame synchronizing signal 413, the data in the BF field is loaded to the frame number counter 512 (step S1504).

Accordingly, the data in the received BF field is outputted from the frame number counter 512, and a hopping pattern register having an address corresponding to "current frame number+1" is selected, similarly to the case of the CS.

The comparator 1401 reads the frequency number stored in the selected hopping pattern register, and compares it to the NF field data sent from the CRC circuit 511 (step S1505).

As a comparison result, if the frequency number stored in the hopping pattern register does not match the NF field data ("No" at step S1506), it is assumed that the frequency is changed, and the received NF field data is written to the selected hopping pattern register (step S1507). Accordingly, the hopping pattern register 518 of the PS is updated in accordance with the hopping pattern of the CS, and frequencies are changed in accordance with the updated hopping pattern (step S1508).

Further, in a case where the frequency number stored in the register matches the NF field data ("Yes" at step S1506), the frequency is not changed, therefore, the NF field data is not written to the hopping pattern register 518.

Further, in a case where there is an error in data in the received BF and NF fields ("No" at step S1503), the CRC circuit 511 does not output the received data, and no data is loaded to the frame number counter 512. As for the clock signal to the frame number counter 512, since the frame synchronizing signal 413 from the frame synchronizer 316 is inputted to the frame number counter 512, in a case no data is loaded to the frame number counter 512, it increments the count by one (step S1509). As a result of using the frame synchronizing signal 413 which is constantly generated regardless of the state of received data, it is possible to follow the same frame number as in the CS even when the BF field data is not received. Further, in a case where there is an error in the received data, the hopping pattern register 518 are not updated in order to prevent a wrong frequency number from being written in the hopping pattern register 518.

Further, it is possible to achieve the same advantage as in the first embodiment by comparing the frequency number which is received with no error to the frequency number stored in the hopping pattern register 518, and updating the hopping pattern register 518 if the frequency numbers do not match.

Note, in the first and second embodiments, the frame number transmitted from the CS is explained as information concerning time, however, a number corresponding to a frequency or a frequency itself can be transmitted from the CS to the PS.

According to the present invention as described above, it is possible to correctly change the frequency to be used in the following transmission frame even in a case where frame number information or frequency number information is not received correctly.

Further, it is possible to provide a reliable communication system in which there is no gap in frequency changeover timing in the originating and destination terminals. Especially, there is an advantage that audio and image communication, which requires real-time communication, can be performed stably.

The present invention is not limited to the above embodiments and various changes and modifications can be made within the spirit and scope of the present invention. Therefore to appraise the public of the scope of the present invention, the following claims are made.

What is claimed is:

1. A wireless communication apparatus which performs communication while changing frequencies according to a frequency hopping pattern, said apparatus comprising:

memory arranged to store information related to a frequency hopping pattern used in communication;

a receiver, that receives information indicating a frequency and transmitted from another wireless communication apparatus;

an error detector, that detects an error in the information received by said receiver; and a controller that controls said wireless communication apparatus to change a frequency not using the information received by said receiver but using the information that was stored in said memory before error detection by said error detector, when an error in the information received by said receiver is detected by said error detector during communication and to change a frequency using the information received by said receiver when no error is detected by said error detector.

2. The wireless communication apparatus according to claim 1, wherein said memory stores the information related to frequencies in correspondence with time information for frequency changeover.

3. The wireless communication apparatus according to claim 2, wherein said controller changes the frequency based on the time information.

4. The wireless communication apparatus according to claim 3, wherein said controller updates the information related to a frequency hopping pattern on the basis of the information received by said receiver, if said error detector does not detect an error in the received information.

5. The wireless communication apparatus according to claim 1, wherein the information received by said receiver includes frequency information indicating a next frequency to change.

6. The wireless communication apparatus according to claim 5, wherein said controller updates the information related to a frequency hopping pattern in said memory on the basis of the information received by said receiver, if said error detector does not detect an error in the received control information.

7. The wireless communication apparatus according to claim 5, wherein said controller includes a comparator arranged to compare the information received by said receiver to the information related to a frequency hopping pattern in said memory, and said controller updates the information related to a frequency hopping pattern in said memory in accordance with a comparison result by said comparison means.

8. The wireless communication apparatus according to claim 1, wherein the information received by said receiver includes first synchronizing information for frequency changeover.

9. The wireless communication apparatus according to claim 8, wherein said communication apparatus communicates while changing frequencies on the basis of the first synchronizing information.

10. The wireless communication apparatus according to claim 8, further comprising an output unit for outputting second synchronizing information for frequency changeover, wherein said communication apparatus communicates by using the first synchronizing information or the second synchronizing information depending upon the error detection by said error detector.

11. A control method for controlling a wireless communication apparatus which stores a plurality of frequencies and performs communication while changing frequencies according to a frequency hopping pattern, said method comprising:

a storing step, of storing in a memory, information related to a frequency hopping pattern used in communication;

a reception step, of receiving information indicating a frequency and transmitted from another wireless communication apparatus;

an error detection step, of detecting an error in the information received in said reception step; and a controlling step, of controlling the wireless communication apparatus to change a frequency not using the information received in said reception step but using the information that was stored in the memory before error detection in said error detection step, when an error in the information received in said reception step is detected in said error detection step during communication and to chance a frequency using the information received in said reception step when no error is detected by said error detector.

12. The control method according to claim 11, wherein information indicating the frequencies is stored in correspondence with time information for frequency changeover.

13. The control method according to claim 12, wherein, in said controlling step, the frequency is changed based on the time information.

14. The control method according to claim 13, wherein, in said controlling step, the information related to a frequency hopping pattern is updated on the basis of the information received in said reception step, if no error is detected in the received information in said error detection step.

15. The control method according to claim 11, wherein the information received in said reception step includes frequency information indicating a next frequency to change.

16. The control method according to claim 15, wherein, in said controlling step, the information related to a frequency hopping pattern is updated in the memory on the basis of the information received in said reception step, if no error is detected in the received control information in said error detection step.

17. The control method according to claim 15, wherein said controlling step further comprises a comparing step, of comparing the information received in said reception step to the information related to a frequency hopping pattern, wherein the information related to a frequency hopping pattern is updated on the basis of the information in accordance with a comparison result obtained in said comparing step.

18. The control method according to claim 11, wherein the information received in said reception step includes first synchronizing information for frequency changeover.

19. The control method according to claim 18, wherein, in said communication step, communication is performed while changing frequencies on the basis of the first synchronizing information.

20. The control method according to claim 18, further comprising an output step, of outputting second synchronizing information for frequency changeover, wherein communication is performed by using the first synchronizing information or the second synchronizing information depending upon the error detection in said error detection step.

21. A wireless communication apparatus performing communication by using a communication frame while changing frequencies, said apparatus comprising:

a receiver, arranged to receive time information for changing a frequency;

memory arranged to store frequency information in accordance with time information;

a counting unit that counts every communication frame and generates time information;

an error determiner, that determines whether or not there is an error in the time information received by said receiver; and an output unit that outputs the frequency information from said memory in correspondence with time information outputted from said counting unit, wherein said counting unit generates time information using the time information received by said receiver when an error is not detected by said error determiner, or generates time information not using the time information received by said receiver when an error is detected by said error determiner.

22. The wireless communication apparatus according to claim 21, wherein the other wireless communication apparatus also transmits frequency information to be used in the next communication frame, said receiver also receives the frequency information, and said error determiner also determines whether or not there is an error in the frequency information, and wherein said output unit outputs the received frequency information to said memory if said error determiner determines that there is no error in the frequency information received by said receiver.

23. The wireless communication apparatus according to claim 21, wherein the other wireless communication apparatus also transmits frequency information to be used in the next communication frame, and said receiver also receives the frequency information, and said error determiner also determines whether there is an error in the frequency information or not, and said wireless communication apparatus further comprises a comparator unit arranged to receive the frequency information, which has been determined that there is no error in it by said error determiner, to the frequency information, stored in said memory, corresponding to the output value from said counting unit, and an overwriter that writes over the frequency information received by said receiver and the frequency information corresponding to the output value from said counting unit in accordance with a comparison result provided by said comparator unit.

24. The wireless communication apparatus according to claim 21, wherein the other wireless communication apparatus transmits a synchronizing signal having a predetermined pattern for achieving frame synchronization at a predetermined position in a communication frame, and said receiver receives the synchronizing signal, and said wireless communication apparatus further comprises a clock signal generator that generates a clock signal synchronized with a timing at which said synchronizing signal is received and input means for inputting the clock signal to said counting unit.

25. The wireless communication apparatus according to claim 24, wherein said clock signal generator has a synchronization locker and generates the clock signal regardless of whether the synchronizing signal is received or not.

26. The wireless communication apparatus according to claim 25, wherein said synchronization locker generates the clock signal when a time period corresponding to one communication frame elapses.

27. The wireless communication apparatus according to claim 24, wherein said clock signal generator includes:

a detector, arranged and constructed to detect the synchronizing signal;

a first counter, which is initialized at a time of detection of the synchronizing signal and outputs a timing pulse when a time period corresponding to one communication frame elapses;

a second counter, that generates a pulse at a position where the synchronizing signal is detected by said detector and outputs a frame position signal indicating a position of a communication frame when a time period corresponding to one communication frame elapses; and a selector, arranged to select the frame position signal as the clock signal if said detector detects the synchronizing signal when the frame position signal is outputted and to select the output from the first counter as the clock signal if said detector fails to detect the synchronizing signal for a predetermined number of times consecutively when the frame position signal is outputted.

28. The wireless communication apparatus according to claim 21, wherein said output unit reads the frequency information, corresponding to a value which is obtained by adding a predetermined value to the output value from said counting unit, from said memory.

29. The wireless communication apparatus according to claim 28, wherein said output unit reads the frequency information, corresponding to a value which is obtained by adding a value predetermined for each communication channel to the output value from said counting unit, from said memory.

30. The wireless communication apparatus according to claim 29, wherein said communication channel includes a control channel, audio channel, and data channel.

31. A control method for controlling a wireless communication apparatus performing communication by using a communication frame while changing frequencies, said method comprising:

a reception step, of receiving time information for changing a frequency;

a counting step, of counting using a counter in every communication frame and generating time information;

an error determination step, of determining whether or not there is an error in the time information received in said reception step; and an outputting step, of outputting the frequency information in correspondence with time information outputted from the counter, wherein, in said counting step, time information is generated using the time information received in said reception step when an error is not detected in said error determination step, or not using the time information received in said reception step when an error is detected in said error determination step.

32. The control method according to claim 31, wherein the other wireless communication apparatus also transmits frequency information to be used in the next communication frame, the frequency information is received in said reception step, and it is determined in said error determination step whether or not there is an error in the frequency information, and wherein said control method further comprises a second writing step, of writing to a memory the frequency information in correspondence with the output value from the counter if it is determined in said determination step that there is no error in the frequency information received in said reception step.

33. The control method according to claim 31, wherein the other wireless communication apparatus also transmits frequency information to be used in the next communication frame, the frequency information is received in said reception step, and it is determined in said error determination step whether or not there is an error in the frequency information, and wherein said controlling method further comprises a comparison step, of comparing the frequency information, which is determined in said determination step not to contain an error, to the frequency information, stored in the memory, corresponding to the output value from the counter, and a writing-over step, of writing over the frequency information received in said reception step and the frequency information corresponding to the output value from the counter in accordance with a comparison result performed in said comparison step.

34. The control method according to claim 31, wherein the other wireless communication apparatus transmits a synchronizing signal having a predetermined pattern for achieving frame synchronization at a predetermined position in a communication frame, and in said reception step, the synchronizing signal is received, and wherein said control method further comprises a generation step of generating a clock signal synchronized with a timing at which said synchronizing signal is received, and an input step, of inputting the clock signal to the counter.

35. The control method according to claim 34, wherein said generation step further comprises a synchronization locking step, in which the clock signal is generated regardless of whether the synchronizing signal is received or not.

36. The control method according to claim 35, wherein, in said synchronization locking step, the clock signal is generated when a time period corresponding to one communication frame elapses.

37. The control method according to claim 34, wherein said generation step further includes:

a detecting step, of detecting the synchronizing signal;

a timing pulse output step, of outputting a timing pulse when a time period corresponding to one communication frame elapses from a time of detection of the synchronizing signal;

a frame position signal output steps of generating a pulse at a position where the synchronizing signal is detected in said detecting step and outputting a frame position signal indicating a position of a communication frame when a time period corresponding to one communication frame elapses; and a selection step, of selecting the frame position signal as the clock signal if the synchronizing signal is detected in said detecting step when the frame position signal is outputted, or the timing pulse as the clock signal if it is failed to detect the synchronizing signal in said detecting step for a predetermined number of times consecutively when the frame position signal is outputted.

38. The control method according to claim 31, wherein, in said reading step, the frequency information corresponding to a value which is obtained by adding a predetermined value to the output value from the counter is read from the memory.

39. The control method according to claim 38, wherein, in said reading step, the frequency information which is obtained by adding a predetermined value for each communication channel to the output value from the counter is read from the memory.

40. The control method according to claim 39, wherein said communication channel includes a control channel, audio channel, and data channel.

41. A wireless communication apparatus performing communication by using a communication frame while changing frequencies, said apparatus comprising a receiver, arranged to receive information, corresponding to a frequency;

memory arranged to store information in correspondence with frequency information;

a counting unit that counts every communication frame and generates information corresponding to a frequency;

an error determiner, that determines whether or not there is an error in the information received by said receiver; and an output unit that outputs the frequency information in correspondence with information outputted from said counting unit, wherein said counting unit generates information using the information received by said receiver when an error is not detected by said error determiner, or generates information not using the information received by said receiver but using the information stored in said memory before error detection by said error determiner when an error is detected by said error determiner.

42. A control method for controlling a wireless communication apparatus performing communication by using a communication frame while changing frequencies, said method comprising:

a reception step, of receiving information, corresponding to a frequency;

a counting step, of counting using a counter in every communication frame for generating information corresponding to a frequency;

an error determination step, of determining whether or not there is an error in the information received in said reception step; and an outputting step, of outputting the frequency information in correspondence with the information outputted from the counter, wherein, in said counting step, the information is generated using the information received in said reception step when an error is not detected in said error determination step, or not using the information received in said reception step but using the information stored before error determination in said error determination step when an error is detected in said error determination step.

43. A wireless communication apparatus performing communication by using a communication frame while changing frequencies, said apparatus comprising:

reception means for receiving time information whose value changes for every communication frame transmitted from another wireless communication apparatus;

memory means for storing frequency information assigned to respective time information;

counting means for counting every communication frame and generating time information;

determination means for determining whether or not there is an error in the time information received by said reception means;

writing means for writing the time information received by said reception means to said counting means if said determination means determines that there is no error in the received time information;

continuing means for making said counting means continue counting if said determination means determines that there is an error in the received time information; and reading means for reading the frequency information from said memory means on the basis of an output value from said counting means, wherein the other wireless communication apparatus transmits a synchronizing signal having a predetermined pattern for achieving frame synchronization at a predetermined position in a communication frame, and said reception means receives the synchronizing signal, and said wireless communication apparatus further comprises generation means for generating a clock signal synchronized with a timing at which said synchronizing signal is received and input means for inputting the clock signal to said counting means, wherein said generation means includes:

detecting means for detecting the synchronizing signal;

a first counter which is initialized at a time of detection of the synchronizing signal and outputs a timing pulse when a time period corresponding to one communication frame elapses;

a second counter for generating a pulse at a position where the synchronizing signal is detected by said detecting means and outputting a frame position signal indicating a position of a communication frame when a time period corresponding to one communication frame elapses; and selection means which selects the frame position signal as the clock signal if said detecting means detects the synchronizing signal when the frame position signal is outputted and selects the output from the first counter as the clock signal if said detecting means fails to detect the synchronizing signal for a predetermined number of times consecutively when the frame position signal is outputted.

44. A control method for controlling a wireless communication apparatus performing communication by using a communication frame while changing frequencies, said method comprising:

a reception step of receiving time information whose value changes for every communication frame transmitted from another wireless communication apparatus;

a counting step of counting every communication frame and generating time information;

a determination step of determining whether or not there is an error in the time information received at said reception step;

a writing step of writing the time information received at said reception step to a counter if it is determined at said determination step that there is no error in the received time information;

a continuing step of continuing the counting at said counting step if it is determined at said determination step that there is an error in the received time information; and a reading step of reading the frequency information from a memory for storing frequency information in correspondence with respective time information on the basis of an output value from the counter, wherein the other wireless communication apparatus transmits a synchronizing signal having a predetermined pattern for achieving frame synchronization at a predetermined position in a communication frame, and at said reception step, the synchronizing signal is received, and said control method further comprises a generation step of generating a clock signal synchronized with a timing at which said synchronizing signal is received and an input step of inputting the clock signal to the counter, wherein said generation step includes:

a detecting step of detecting the synchronizing signal;

a timing pulse output step of outputting a timing pulse when a time period corresponding to one communication frame elapses from a time of detection of the synchronizing signal;

a frame position signal output step of generating a pulse at a position where the synchronizing signal is detected at said detecting step and outputting a frame position signal indicating a position of a communication frame when a time period corresponding to one communication frame elapses; and a selection step of selecting the frame position signal as the clock signal if the synchronizing signal is detected at said detecting step when the frame position signal is outputted, or the timing pulse as the clock signal if it is failed to detect the synchronizing signal at said detecting step for a predetermined number of times consecutively when the frame position signal is outputted.

* * * * *

UNITED STATES PATENT AND TRADEMARK OFFICE
CERTIFICATE OF CORRECTION

PATENT NO. : 6,275,517 B1
DATED : August 14, 2001
INVENTOR(S) : Michihiro Izumi

It is certified that error appears in the above-identified patent and that said Letters Patent is hereby corrected as shown below:

Column 2,
Line 66, "international" should read -- International --.

Column 8,
Line 65, "are" should read -- is --.

Column 9,
Line 15, "are" should read -- is --.

Column 12,
Line 28, "are" should read -- is --.

Column 17,
Line 38, "steps" should read -- step, --;
Line 48, "if it is" should read -- if --;
Line 49, "failed to detect the synchronizing signal: should read -- the synchronizing signal is not detected --; and
Line 67, "comprising" should read -- comprising: --.

Signed and Sealed this

Ninth Day of July, 2002

Attest:

JAMES E. ROGAN
Attesting Officer
Director of the United States Patent and Trademark Office